No. 799,523. PATENTED SEPT. 12, 1905.
W. L. BLISS.
TRAIN LIGHTING SYSTEM.
APPLICATION FILED MAR. 15, 1905.
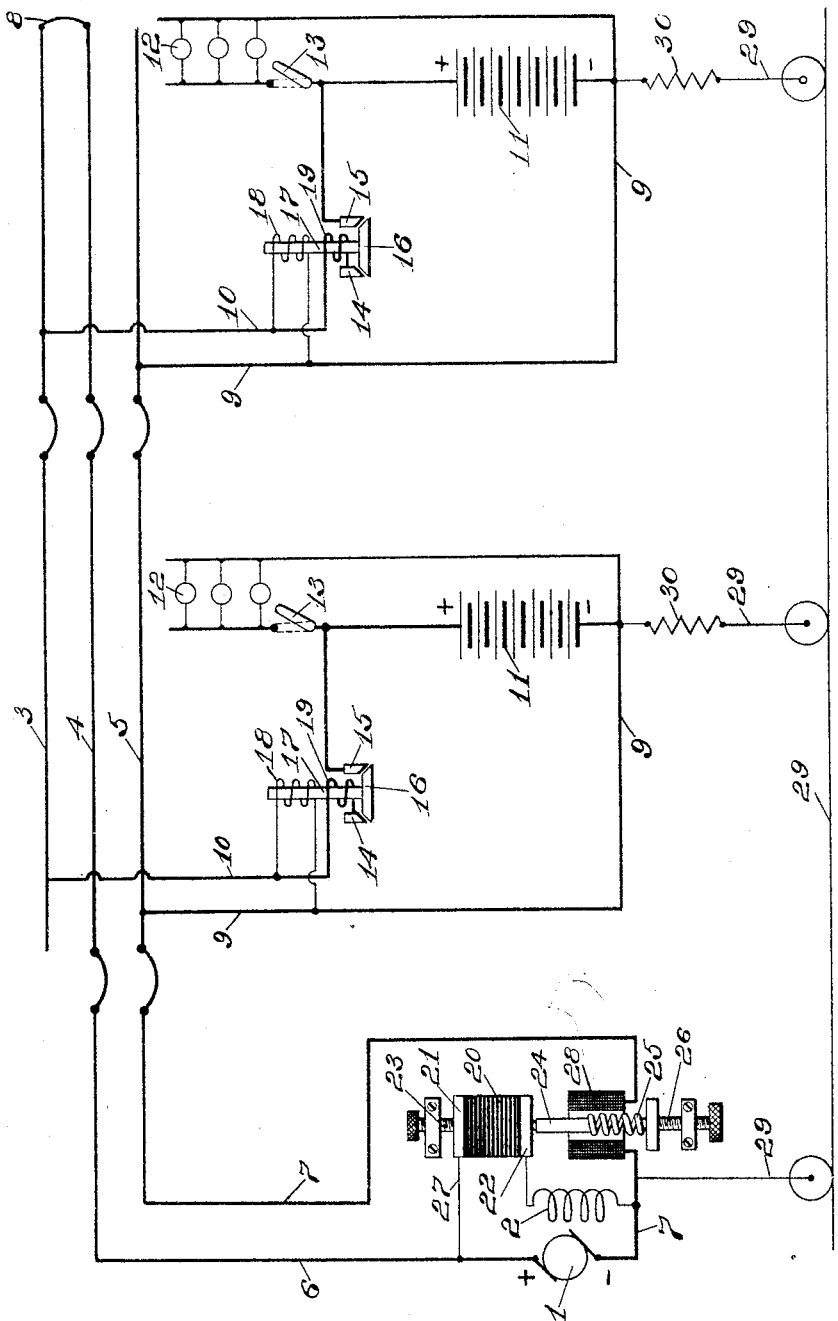
WITNESSES:
Herbert J. Smith
J. W. Robertson
INVENTOR:
William L. Bliss
BY:
Edwin B. H. Tower, Jr.
ATTORNEY.

UNITED STATES PATENT OFFICE.

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,523.     Specification of Letters Patent.     Patented Sept. 12, 1905.

Application filed March 15, 1905. Serial No. 250,249.

*To all whom it may concern:*

Be it known that I, WILLIAM L. BLISS, a citizen of the United States, residing at Brooklyn, in the county of Kings and State of New York, have invented new and useful Improvements in Train-Lighting Systems, of which the following is a full, clear, concise, and exact description, reference being had to the accompanying drawing, forming a part of this specification.

The present invention relates to improvements in lighting systems which are especially adapted to be employed for lighting cars or other units of transportation by electricity.

The particular form of the system to which the present invention especially relates is adapted to be employed for lighting a train of cars. It is provided with a single generator which furnishes the current for operating the entire system. It is also provided with storage batteries and translating devices arranged in circuit with said generator, a storage battery and translating device being arranged upon each car or unit in the train. The generator is driven by an axle or other means, and it is regulated by means of an automatic regulator which responds to variations in electrical conditions to confine the output thereof within safe limits, notwithstanding the wide variations in speed to which it is subjected.

The present application sets forth and claims a modification of an invention which is explained in an application filed June 15, 1904, Serial No. 212,593.

According to the present invention a rheostatic device or variable resistance is employed to regulate the generator, said rheostatic device being controlled in operation by an electromagnet.

The current which it is necessary for the generator to supply depends upon the number of cars or units in the train. Whenever cars are added to the train, the current must increase, and whenever cars are taken therefrom it must decrease. If the regulator be subjected to variations in current under such circumstances, then it will cause the regulation of the generator to be altered, thereby preventing said generator from making the output thereof commensurate with the demands for current. The purposes of the regulator will be accomplished if it responds to merely such variations in the output of the generator as result from variations in the speed thereof.

The object of the present invention is to provide means which will prevent the regulator from altering the regulation of the generator when variations in the output of the generator result from changes in the number of cars or units in the train.

The accompanying drawing illustrates a system which will be explained for the purpose of disclosing the present invention. It will of course be understood that the system illustrated in the drawing may be changed in many ways without departing from the invention and, furthermore, that said drawing illustrates merely sufficient features of the system to characterize the invention.

The generator may be provided with an armature 1 and a field 2, and it is preferably arranged upon the tender of the locomotive; but it may be carried elsewhere upon the train. The armature is preferably geared to an axle, and the field is preferably arranged in circuit in shunt with the armature. The generator is regulated by a rheostatic device or variable resistance which varies the strength of the field inversely as the speed of the armature varies, thereby causing the output of the generator to be confined within such limits as are safe for the system. The rheostatic device or variable resistance is preferably arranged upon the tender with the generator, and it may be of various forms and operated in different ways. The train is preferably provided with a train-line or main circuit, which extends through the cars or units thereof, said train-line preferably being composed of conductors 3, 4, and 5. The conductors 4 and 5 are preferably connected to the generator at the forward end of the train by conductors or supply-mains 6 and 7, and the conductors 3 and 4 are preferably connected to each other at the rear end of the train by a conductor or jumper 8.

The equipment which is installed upon each car will now be explained. The drawing illustrates equipments for two cars, and as both the equipments are alike reference will be made to a single car in explaining same. The car is provided with a local circuit composed of conductors 9 and 10, the conductor 9 being connected to the conductor 5 and the conductor 10 being connected to the conductor 3.

The several local circuits in the system may be arranged in parallel across the train-line. As the length of the main circuit between the generator and each local circuit is the same, equal voltages will be impressed upon the local circuits. The car is also provided with a storage battery 11 and lamps and other translating devices 12, said battery and said lamps preferably being arranged in the local circuit in parallel. The circuit of the lamps is preferably controlled by a switch 13. The local circuit is preferably controlled by an automatic switch, which may be provided with stationary contacts 14 and 15 and a movable contact 16, said movable contact being adapted to engage said stationary contacts to close the local circuit. The movable contact is preferably carried by plunger 17, which is actuated by windings 18 and 19. The winding 18 is preferably arranged across the local circuit between the switch-contacts and the train-line, and the winding 19 is preferably arranged in a series with the switch-contacts and the storage battery. The shunt-winding 18 will cause the switch to close whenever the voltage of the generator becomes equal to that of the storage battery. While the automatic switch remains closed the series winding 19 will be energized by the current flowing through the local circuit, and so long as the generator sends current through the local circuit the series winding will assist the shunt-winding in keeping the movable contact firmly in engagement with the stationary contacts. Whenever the voltage of the generator falls below that of the storage battery, current will flow backward through the local circuit from the storage battery, and then the series winding will oppose the shunt-winding, as the polarity thereof will be reversed, thereby causing the switch to open.

The rheostatic device or variable resistance which is employed to regulate the generator may be provided with a series of resistance-plates 20, of carbon or other suitable material. The resistance-plates are placed in contact with each other, the same preferably being arranged between a stationary terminal block 21 and a movable block 22. The stationary terminal block is preferably engaged by a screw 23, by which the position thereof may be adjusted. The movable terminal block is preferably mounted upon a plunger 24, which bears upon a spring 25, said plunger being pressed upwardly by said spring to press the resistance-plates together. The spring is preferably mounted upon a screw 26, which is provided for adjusting the tension thereof. The stationary terminal block 21 is preferably connected to the supply-main 6 by conductor 27, and the movable terminal block 22 is preferably connected to one terminal of the field 2, the other terminals of said field being connected to the supply-main 7. The field 2 is thus arranged in series with the resistance-plates 20 across the main or supply circuit. The plunger 24 may be actuated by an electromagnet 28 to regulate the pressure between the resistance-plates, said magnet preferably being arranged in the main circuit between the generator and the local circuits. The output of the generator will increase whenever the speed thereof increases, thereby causing the strength of the controlling-electromagnet 28 to increase, and it will decrease whenever the speed thereof decreases, thereby causing the strength of said magnet to decrease. Whenever the strength of said magnet increases, the pressure between the resistance-plates will be decreased, thereby increasing the resistance in circuit with the field, and when the strength thereof decreases the pressure between the resistance-plates will be increased, thereby causing the resistance in circuit with the field to decrease. The strength of the field will thus be varied inversely as the speed of the armature varies, and in consequence the output of the generator will be confined within safe limits.

When the generator is in operation, current will flow from the positive terminal thereof through supply-main 6, conductor 4, and jumper 8 to conductor 3, thence through the local circuits, and finally through conductor 5, supply-main 7, and controlling electromagnet 28 to the negative terminal thereof. If the voltage of the generator be substantially equal to that of the storage battery, the current for operating the lamps will be furnished by the generator and the storage battery together; but if it be greater than that of the storage battery the generator will furnish the entire current for operating the lamps and also a current for charging the storage battery. It being assumed that the voltage of the generator is greater than that of the storage battery, the current in the local circuit will flow from the supply-main 10 through the automatic switch, then through the switch 13 and the lamps 12, and also through the storage battery 11 to the conductor 9. Inasmuch as the current delivered to the storage battery depends upon the voltage developed by the generator, it will vary whenever the speed of the generator varies. The current delivered to the storage battery will increase in almost direct proportion to the rise in voltage of the generator above the normal voltage of the storage battery, thereby causing the controlling-electromagnet of the variable resistance to be subjected to considerable variations in the current upon slight variations in the speed of the armature. When cars are added to the train, the output of the generator will increase to supply the demand for current, because new parallel circuits are placed across the main circuit or train-line, and when cars are taken from the train the output of the generator will decrease in accordance with the decrease in the demand for current, because parallel circuits are removed from across the main circuit or train-line. It may be assumed where two cars are in the train, as illustrated in the drawing, that the generator delivers a current of one hundred amperes, a current of fifty amperes being distributed to each car. If a car be added to the train, the output of the generator will increase to one hundred and fifty amperes, and if a car be taken therefrom it will decrease to fifty amperes.

If the controlling-electromagnet were subjected to variations in current upon changes in the number of cars in the train, it would cause the regulator to alter the regulation of the generator, thereby preventing the generator from varying the output thereof in accordance with the variations in the demands for current. To prevent such result, a shunt-circuit 29 may be extended from the local main 9 of each car to the supply-main 7, such shunt-circuit being placed around the controlling-electromagnet 28 to divert current therefrom. The shunt-circuit of each car is arranged in parallel with the other shunt-circuits, and it is provided with a resistance 30 to prevent the same from short-circuiting said magnet. The wheels of the cars and the track upon which said wheels bear, as well as the conducting-framework of the cars, may constitute parts of each shunt-circuit. It will of course be understood that any form of conductor may be employed to form the shunt-circuits. If a car be added to the train, another shunt-circuit will be provided, thereby increasing the number of parallel shunt-circuits around the controlling-electromagnet, and in consequence the current diverted from the controlling-electromagnet will increase to such an extent as to prevent said magnet from being subjected materially to the increase in the output of the generator. If a car be taken from the train, a shunt-circuit will be removed from the system, thereby decreasing the number of parallel shunt-circuits around said controlling-electromagnet, and in consequence the current diverted from said magnet will be decreased to such an extent as to prevent the said magnet from being subjected materially to the decrease in the output of the generator. The output of the generator may therefore vary whenever cars are added to the train or taken therefrom without causing the controlling-electromagnet to alter the regulation of the generator.

It will be understood that many changes may be made in the system which has been set forth herein without in any way departing from the invention as defined by the claims appended hereto.

Having described my invention, what I claim as new, and desire to secure by Letters Patent, is—

1. In a train-lighting system, in combination, a generator driven at a variable speed, a storage battery and translating devices carried upon each of a plurality of units of the train and connected in circuit with said generator, an automatic rheostatic device regulating said generator to confine the output thereof within prearranged limits, and means for preventing said rheostatic device from altering the regulation of the generator upon variations in the output of the generator resulting from changes in the number of units in the train.

2. In a train-lighting system, in combination, a generator driven at a variable speed, an automatic rheostatic device regulating said generator to confine the output thereof within prearranged limits, translating devices carried upon each of a plurality of units of the train and arranged in circuit with said generator, and means for preventing said rheostatic device from altering the regulation of said generator upon variations in the output of said generator resulting from changes in the number of units in the train.

3. In a train-lighting system, in combination, a generator driven at a variable speed and provided with a field-winding, a main circuit extending from said generator, an automatic rheostatic device for regulating the strength of the current in said field-winding to confine the output of said generator within prearranged limits, an electromagnet controlling the operation of said rheostatic device and arranged in said main circuit in series, a storage battery and translating devices carried upon each of a plurality of units of the train and connected to said main circuit, and means for preventing said electromagnet from causing said rheostatic device to alter the regulation of said generator upon variations in the output of said generator resulting from changes in the number of units in the train.

4. In a train-lighting system, in combination, a generator arranged upon the tender of the locomotive and driven at a variable speed, a main circuit extending from the generator, a local circuit arranged upon each of said cars, a storage battery and translating device arranged in each local circuit, an automatic rheostatic device regulating said generator to confine the output thereof within prearranged limits, said rheostatic device being arranged upon said tender, an electromagnet controlling the operation of said rheostatic device, said electromagnet being arranged in the said main circuit in series with said storage batteries and said translating devices, and means for preventing said electromagnet from causing said rheostatic device to alter the regulation of said generator upon variations in the output of said generator resulting from changes in the number of units in the train.

5. In a train-lighting system, in combination, a generator driven at a variable speed, a main circuit extending from said generator, a local circuit arranged upon each of a plurality of units of the train and connected to said main circuit, translating devices arranged in each local circuit, a rheostatic device regulating said generator to confine the output thereof within prearranged limits, an electromagnet controlling the operation of said rheostatic device and arranged in said main circuit in series, and a shunt-circuit extending from each local circuit to said main circuit and passing around said magnet.

6. In a train-lighting system, in combination, a generator driven at a variable speed, a main circuit extending from said generator, a local circuit arranged upon each of a plurality of units of the train and connected to said main circuit, a storage battery and translating devices arranged in each local circuit, a rheostatic device regulating said generator to confine the output thereof within prearranged limits, an electromagnet controlling the operation of said rheostatic device and arranged in said main circuit in series with said storage batteries and translating devices, and a shunt-circuit extending from each local circuit to said main circuit and passing around said magnet.

7. In a train-lighting system, in combination, a generator driven at a variable speed, a main circuit extending from said generator, a local circuit arranged upon each of a plurality of units of the train and connected to said main circuit, a storage battery and translating devices arranged in each local circuit, an automatic switch controlling each local circuit, a rheostatic device for regulating said generator to confine the output thereof within prearranged limits, an electromagnet controlling the operation of said rheostatic device, and a shunt-circuit extending from each local circuit to said main circuit and passing around said electromagnet, each shunt-circuit being provided with a resistance and arranged in parallel with the other shunt-circuits.

8. In a train-lighting system, in combination, a generator driven at a variable speed and provided with a field-winding, a main circuit extending from said generator, a local circuit arranged upon each of a plurality of units of the train and connected to said main circuit in parallel with the other local circuits, a storage battery and translating devices arranged in each local circuit, a variable resistance arranged in circuit with said field-winding, an electromagnet controlling said variable resistance and arranged in said main circuit in series with said storage batteries and translating devices, and a shunt-circuit extending from each local circuit to said main circuit and passing around said electromagnet.

9. In a train-lighting system, in combination, a generator driven at a variable speed and provided with a field-winding, a main circuit extending from said generator, a local circuit arranged upon each of a plurality of units of the train and connected to said main circuit in parallel with the other local circuits, an automatic switch controlling each local circuit, a storage battery and translating devices arranged in each local circuit, a variable resistance arranged in circuit with said field-winding, an electromagnet controlling said resistance and arranged in said main circuit in series between said generator and said local circuits, and a shunt-circuit extending from each local circuit to said main circuit and passing around said electromagnet, each shunt-circuit being provided with a resistance and arranged in parallel with the other shunt-circuits.

10. In a train-lighting system, in combination, a generator arranged upon the tender of the locomotive and driven at a variable speed, a main circuit extending from said generator and passing through a plurality of cars, a local circuit arranged upon each car and connected to said main circuit in parallel, a storage battery and translating devices arranged in each local circuit, a rheostatic device arranged upon said tender and regulating said generator to confine the output thereof within prearranged limits, an electromagnet controlling the operation of said rheostatic device and arranged in said main circuit between said generator and said local circuits, and a shunt-circuit extending from each local circuit to said main circuit and passing around said electromagnet.

11. In a train-lighting system, in combination a generator arranged upon the tender of the locomotive and driven at a variable speed, said generator being provided with a field-winding, a main circuit extending from said generator and passing through a plurality of cars, a local circuit arranged upon each of said cars and connected to said main circuit in parallel with the other local circuits, a storage battery and translating devices arranged in each local circuit, a variable resistance carried upon said tender and arranged in series with said field-winding, an electromagnet controlling said variable resistance and arranged in said main circuit in series between said generator and said local circuits, and a shunt-circuit extending from each local circuit to said main circuit and passing around said magnet, each shunt-circuit being provided with a resistance and arranged in parallel with the other shunt-circuits.

12. In a train-lighting system, in combination, a generator driven at a variable speed, translating devices carried upon each of a plurality of units of the train and arranged in circuit in parallel with said generator, a rheostatic device for regulating said generator to confine the output thereof within prearranged limits, an electromagnet controlling the operation of said rheostatic device and arranged in circuit to be responsive to variations in current upon variations in the speed of said generator, and means to prevent said magnet from causing said rheostatic device to alter the regulation of said generator upon variations in the output of said generator resulting from changes in the number of units in the train.

13. In a train-lighting system, in combination, a generator driven at a variable speed, a storage battery and translating devices carried upon each of a plurality of units of the train and arranged in circuit in parallel with said generator, a rheostatic device for regulating said generator to confine the output thereof within prearranged limits, an electromagnet controlling the operation of said rheostatic device and arranged in circuit to be responsive to variations in current upon variations in the speed of said generator, and means for preventing said magnet from causing said rheostatic device to alter the regulation of said generator upon variations in the output of said generator resulting from changes in the number of units in the train.

14. In a train-lighting system, in combination, a generator driven at a variable speed, translating devices carried upon each of a plurality of units of the train and arranged in circuit with said generator in parallel, a rheostatic device for regulating said generator to confine the output thereof within prearranged limits, an electromagnet controlling the operation of said rheostatic device and arranged in circuit to respond to variations in current upon variations in the speed of said generator, and a parallel shunt-circuit extending around said magnet from each of said units, whereby the output of said generator may vary upon changes in the number of units in the train without thereby causing said rheostatic device to alter the regulation of said generator.

15. In a train-lighting system, in combination, a generator driven at a variable speed, a storage battery and translating devices carried upon each of a plurality of units of the train and arranged in circuit in parallel with said generator, a rheostatic device for regulating said generator to confine the output thereof within prearranged limits, an electromagnet controlling the operation of said rheostatic device and arranged in circuit to be responsive to variations in current upon variations in the speed of said generator, and a parallel shunt-circuit extending around said magnet from each of said units, whereby the output of said generator may vary upon changes in the number of units in the train without thereby causing said rheostatic device to alter the regulation of said generator.

In witness whereof I have hereunto subscribed my name in the presence of two witnesses.

WILLIAM L. BLISS.

Witnesses:
   J. N. ROBERTSON,
   GEORGE MULLER.